(12) United States Patent
Kim et al.

(10) Patent No.: US 12,078,210 B2
(45) Date of Patent: Sep. 3, 2024

(54) VEHICLE WHEEL BEARING HAVING ENHANCED SEALING FUNCTION

(71) Applicant: ILJIN GLOBAL Co., Ltd, Seoul (KR)

(72) Inventors: Yong Won Kim, Jecheon-si (KR); Seong Kyu Jin, Jinju-si (KR)

(73) Assignee: ILJIN GLOBAL Co., Ltd, Seoul (KR)

(*) Notice: Subject to any disclaimer, the term of this patent is extended or adjusted under 35 U.S.C. 154(b) by 332 days.

(21) Appl. No.: 17/400,726

(22) Filed: Aug. 12, 2021

(65) Prior Publication Data

US 2021/0372476 A1 Dec. 2, 2021

Related U.S. Application Data

(63) Continuation of application No. PCT/KR2019/012097, filed on Sep. 18, 2019.

(30) Foreign Application Priority Data

Feb. 15, 2019 (KR) .................. 10-2019-0018192

(51) Int. Cl.
*F16C 33/78* (2006.01)
*B60B 27/00* (2006.01)
(Continued)

(52) U.S. Cl.
CPC ...... *F16C 33/7879* (2013.01); *B60B 27/0073* (2013.01); *F16C 19/186* (2013.01);
(Continued)

(58) Field of Classification Search
CPC ................ F16C 19/186; F16C 33/7823; F16C 33/7879; F16C 33/7883; F16C 33/7886;
(Continued)

(56) References Cited

U.S. PATENT DOCUMENTS 10,240,674 B2 * 3/2019 Sakai .................. F16J 15/3264
2013/0127119 A1 5/2013 Haepp et al.
(Continued)

FOREIGN PATENT DOCUMENTS

CN 207033996 U 2/2018
JP 2006220270 A 8/2006
(Continued)

OTHER PUBLICATIONS

International Search Report of PCT/KR2019/012097 dated Jan. 3, 2020.

*Primary Examiner* — Alan B Waits
(74) *Attorney, Agent, or Firm* — Dinsmore & Shohl LLP; Yongsok Choi, Esq.

(57) ABSTRACT

A vehicle wheel bearing includes a wheel hub having a hub flange to which a wheel is mounted; at least one inner ring mounted to one side of the wheel hub in a press-fitting manner; an outer ring provided radially outward of the inner ring and having a mounting flange to be mounted to the vehicle body on an outer circumferential surface; one or more rolling elements provided radially inward of the outer ring; and a sealing member configured to prevent foreign matters from flowing into the wheel bearing. The sealing member includes a first sealing member mounted to the wheel hub or the inner ring; and a second sealing member mounted to the outer ring. One or more elastic sealing lips are provided in one or both of the first sealing member and the second sealing member.

16 Claims, 8 Drawing Sheets

(51) Int. Cl.
*F16C 19/18* (2006.01)
*F16C 33/80* (2006.01)

(52) U.S. Cl.
CPC ........ *F16C 33/7886* (2013.01); *F16C 33/805*
(2013.01); *F16C 2326/02* (2013.01)

(58) Field of Classification Search
CPC .... F16C 33/80; F16C 33/805; F16C 2326/02;
B60B 27/0073
See application file for complete search history.

(56) References Cited

U.S. PATENT DOCUMENTS

2016/0003302 A1* 1/2016 Seno .................... F16J 15/3232
277/351
2016/0221391 A1* 8/2016 Lim ..................... F16J 15/3264

FOREIGN PATENT DOCUMENTS

| KR | 101383275 B1 | 4/2014 |
| KR | 1020170131974 A | 12/2017 |
| KR | 1020190003026 A | 1/2019 |

* cited by examiner

FIG. 1

PRIOR ART

FIG. 2

PRIOR ART

VEHICLE WHEEL BEARING HAVING ENHANCED SEALING FUNCTION

CROSS-REFERENCE TO RELATED APPLICATION

This application is a continuation of International Application No. PCT/KR2019/012097 filed on Sep. 18, 2019 which claims priority to Korean Patent Application No. 10-2019-0018192 filed on Feb. 15, 2019, the entire contents of which are herein incorporated by reference.

TECHNICAL FIELD

The present invention relates to a vehicle wheel bearing for rotatably mounting and supporting a wheel of a vehicle to a vehicle body, more particularly, to a vehicle wheel bearing which is capable of preventing inflow of foreign matters or leakage of internal lubricant in a more stable manner using a sealing member of an improved structure.

BACKGROUND ART

Figure 1:
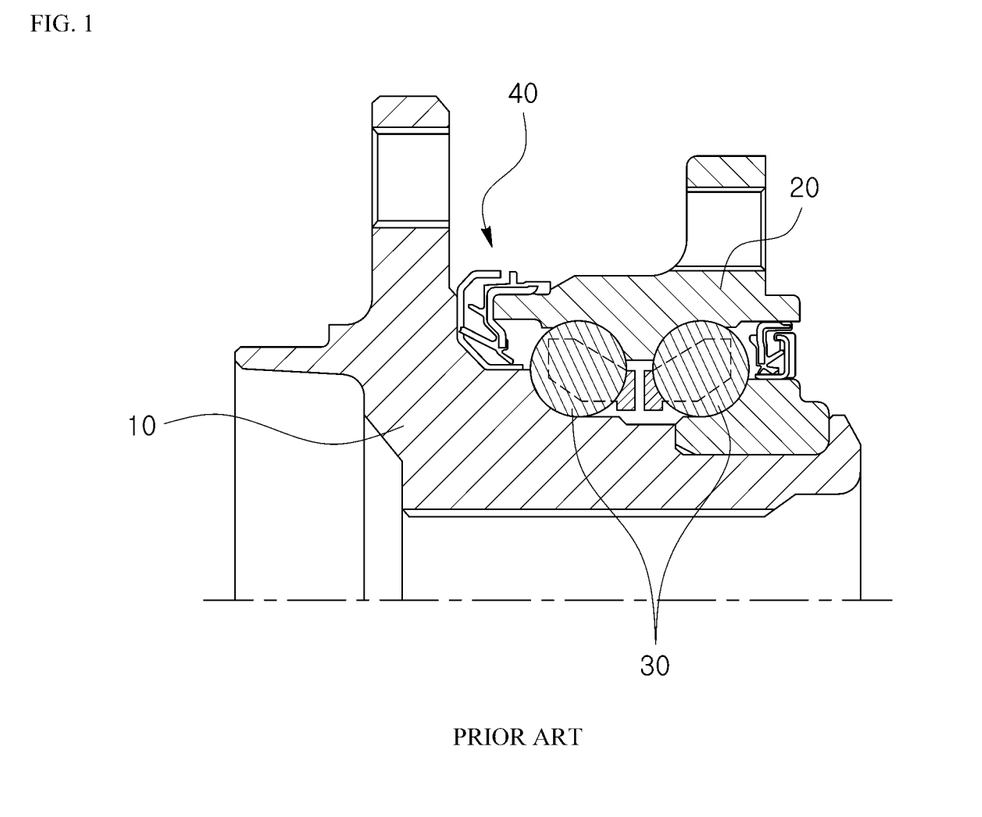
FIG. 1 illustrates a structure of a conventional vehicle wheel bearing.

A wheel bearing is used to rotatably mount and support a wheel of a vehicle to a vehicle body. As illustrated in FIG. 1, the wheel bearing connects a rotary element 10 (wheel hub) to which the wheel is mounted to a non-rotary element 20 (outer ring) fixed to the vehicle body through rolling elements 30 such that the wheel mounted to the rotary element 10 is supported by the vehicle body while being rotatably mounted to the vehicle body.

Meanwhile, since such a wheel bearing is used in a state that the wheel bearing is mounted to the wheel of the vehicle, the wheel bearing is likely to be exposed to external foreign matters such as dust and moisture. Therefore, in order to prevent generation of noise, damage to the rolling elements or damage to raceway of the rolling elements due to foreign matters introduced into the wheel bearing when the vehicle is operating, a sealing member 40 may be mounted to one or both sides of the wheel bearing.

Figure 2:
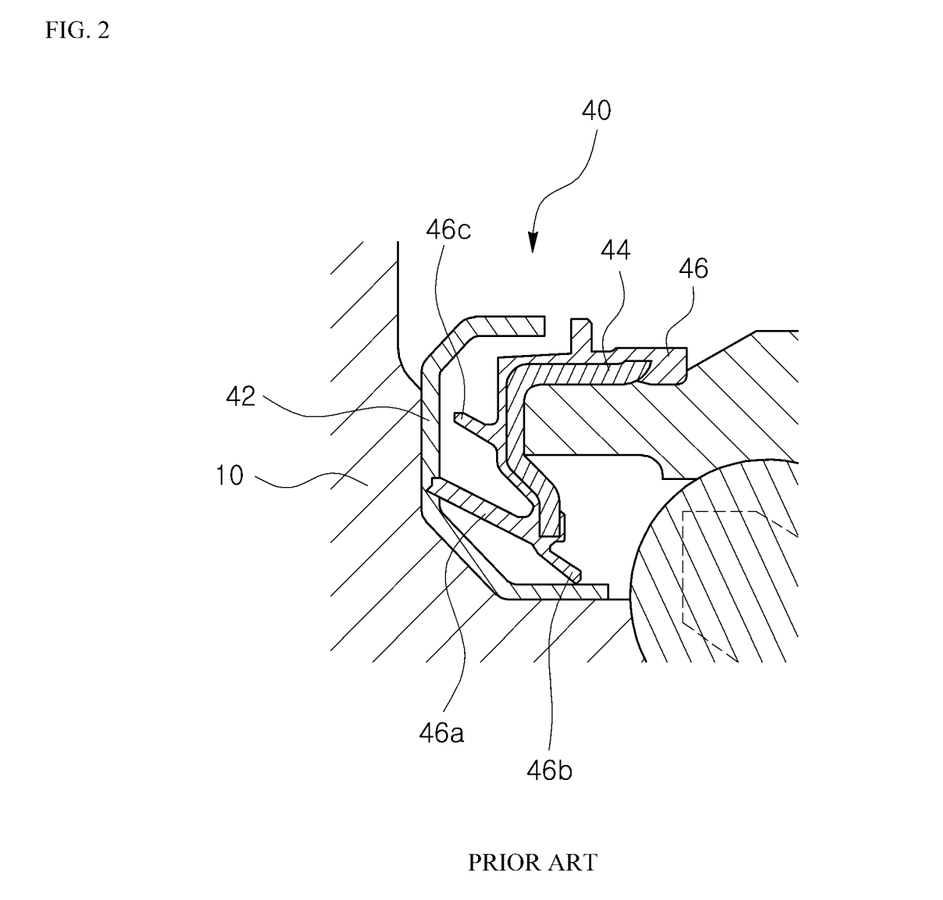
FIG. 2 illustrates an exemplary structure of a sealing member provided between a wheel hub and an outer ring in the conventional vehicle wheel bearing illustrated in FIG. 1.

Referring to FIG. 2, an example of the sealing member 40 for a wheel bearing which has been used in the related art is illustrated. As illustrated in FIG. 2, the sealing member 40 for the wheel bearing may be configured to perform a sealing function using a slinger mounted to a wheel hub (or an inner ring) and a sealing portion mounted to an outer ring.

For example, in the sealing member 40 for the wheel bearing, a slinger 42 is mounted to one side of the wheel hub 10 or the like in a press-fitting manner, and a sealing portion provided with a frame 44 and an elastic sealing portion 46 is mounted to the outer ring 20. Thus, the sealing member 40 for the wheel bearing may perform the sealing function by the cooperation of the elastic sealing portion 46 and the slinger 42.

Specifically, in the sealing member 40 illustrated in FIG. 2, a plurality of elastic sealing lips 46a, 46b and 46c are formed in the elastic sealing portion 46 attached to the frame 44 of the sealing portion. The elastic sealing lips 46a, 46b and 46c are in contact with the slinger 42 or arranged adjacent to the slinger 42 to perform the sealing function.

In order to prevent inflow of foreign matters in a more stable manner using the sealing member 40, it is preferable that the plurality of elastic sealing lips are brought into contact with the slinger 42 or the elastic sealing lips having a relatively thick thickness are brought into contact with the slinger 42. However, the elastic sealing lips operating in contact with the slinger 42 may increase drag torque during the operation of the vehicle, which may result in degradation in driving efficiency of the vehicle.

To address this problem, in recent years, various research has been done on techniques for preventing the inflow of foreign matters by forming a complex labyrinth structure in the sealing member using non-contact sealing lips.

However, even though such a labyrinth structure is formed in the sealing member, it is impossible to completely prevent the inflow of foreign matters through the labyrinth structure. Thus, the labyrinth structure needs to delay the inflow of foreign matters as much as possible, and minimize the risk of the inflow of foreign matters to a space where the rolling elements are disposed.

In addition, in the conventional sealing member 40 as illustrated in FIG. 2, the slinger 42 is mounted in close contact with a hub flange of the wheel hub 10. Accordingly, when the hub flange is deformed due to the vibration applied to the wheel hub 10 during the operation of the vehicle, the slinger 42 mounted in close contact with the hub flange may be also deformed. This degrades the sealing performance or increases the drag torque.

PRIOR ART DOCUMENT

Patent Document 1: Korean Patent No. 10-1383275 (registration date: Apr. 2, 2014)

SUMMARY

Technical Problem

The present invention is made to solve the above problems related to the conventional vehicle wheel bearing, and an object of the present invention is to provide a vehicle wheel bearing configured to prevent inflow of foreign matters or leakage of internal lubricant (grease) in a more stable manner by using a sealing member of an improved structure.

Technical Solution

Representative configurations of the present invention to achieve the above object are described below.

According to an embodiment of the present invention, there is provided a vehicle wheel bearing for rotatably mounting and supporting a wheel of a vehicle to a vehicle body. The vehicle wheel bearing according to an embodiment of the present invention may comprise: a wheel hub having a hub flange to which the wheel is mounted; at least one inner ring mounted to one side of the wheel hub in a press-fitting manner; an outer ring provided radially outward of the inner ring and having a mounting flange to be mounted to the vehicle on an outer circumferential surface; one or more rolling elements provided radially inward of the outer ring; and a sealing member configured to prevent foreign matters from flowing into the wheel bearing. According to an embodiment of the present invention, the sealing member may comprise a first sealing member mounted to the wheel hub or the inner ring; and a second sealing member mounted to the outer ring. According to an embodiment of the present invention, one or more elastic sealing lips may be provided in one or both of the first sealing member and the second sealing member. According to an embodiment of the present invention, one or more radially recessed grooves may be formed on a radial outer surface of some or all of the one or more elastic sealing lips.

According to an embodiment of the present invention, the grooves may be formed to be recessed to a depth of 0.05 mm or more from the radial outer surface.

According to an embodiment of the present invention, the one or more elastic sealing lips may comprise one or more contact sealing lips and one or more non-contact sealing lips, and the grooves may be formed in some or all of the non-contact sealing lips.

According to an embodiment of the present invention, the one or more elastic sealing lips may have a smooth radial inner surface without a concave-convex structure.

According to an embodiment of the present invention, one or more lateral grooves may be formed on a lateral sealing portion extending in a radial direction.

According to an embodiment of the present invention, the first sealing member may comprise a slinger mounted to the wheel hub in a press-fitting manner, the slinger may comprise a press-fitting portion press-fitted to an outer circumferential surface of the wheel hub; and a radially extended portion extending radially outward from the press-fitting portion. According to an embodiment of the present invention, the radially extended portion of the slinger may be disposed spaced apart from the wheel hub to which the slinger is press-fitted.

According to an embodiment of the present invention, there is provided a vehicle wheel bearing for rotatably mounting and supporting a wheel of a vehicle to a vehicle body. The vehicle wheel bearing according to an embodiment of the present invention may comprise: a wheel hub having a hub flange to which the wheel is mounted; at least one inner ring mounted to one side of the wheel hub in a press-fitting manner; an outer ring provided radially outward of the inner ring and having a mounting flange to be mounted to the vehicle body on an outer circumferential surface; one or more rolling elements provided radially inward of the outer ring; and a sealing member configured to prevent foreign matters from flowing into the wheel bearing. According to an embodiment of the present invention, the sealing member may comprise a first sealing member mounted to the wheel hub or the inner ring; and a second sealing member mounted to the outer ring. According to an embodiment of the present invention, the first sealing member may comprise a slinger mounted to the wheel hub in a press-fitting manner and a first elastic sealing portion attached to the slinger, the second sealing member may comprise a frame mounted to the outer ring in a press-fitting manner and a second elastic sealing portion attached to the frame. According to an embodiment of the present invention, the first elastic sealing portion may comprise at least one first elastic sealing lip extending toward the second sealing member, and the second elastic sealing portion may comprise a second elastic sealing lip extending toward the first sealing member and configured to perform a sealing function in cooperation with the first elastic sealing lip; and a third elastic sealing lip extending toward the first sealing member and configured to perform the sealing function in cooperation with the slinger. According to an embodiment of the present invention, the first elastic sealing lip and the second elastic sealing lip may be disposed more radially outward than the third elastic sealing lip while being not in contact with each other.

According to an embodiment of the present invention, end portions of the one or more first elastic sealing lip and the second elastic sealing lip may extend radially outward to form an accommodation space in which the foreign matters introduced from an outside are accommodated.

According to an embodiment of the present invention, the first elastic sealing lip and the second elastic sealing lip may be alternately disposed in a radial direction.

According to an embodiment of the present invention, the third elastic sealing lip may comprise at least one contact sealing lip whose end are in contact with the slinger and at least one non-contact sealing lip whose end is disposed adjacent to the slinger.

According to an embodiment of the present invention, the non-contact sealing lip of the third elastic sealing lip may be located more radially outward than the contact sealing lip of the third elastic sealing lip.

According to an embodiment of the present invention, the end of the non-contact sealing lip of the third sealing lip may be located within a distance of 0.2 mm or less from the slinger.

According to an embodiment of the present invention, one or more radially recessed grooves may be formed on a radial outer surface of some or all of the first elastic sealing lip and the second elastic sealing lip.

According to an embodiment of the present invention, the grooves may be formed to be recessed to a depth of 0.05 mm or more from the radial outer surface.

According to an embodiment of the present invention, the first elastic sealing lip and the second elastic sealing lip may have a smooth radial inner surface without a concave-convex structure.

According to an embodiment of the present invention, one or more lateral grooves may be further formed on a lateral sealing portion extending in the radial direction in at least one of the first sealing member and the second sealing member.

According to an embodiment of the present invention, the second elastic sealing portion may further comprise a fourth elastic sealing lip provided radially outward of the second elastic sealing lip and configured to surround a radial outer portion of the first elastic sealing portion.

According to an embodiment of the present invention, the second elastic sealing portion may further comprise a dam portion provided on a radial outer surface of the second elastic sealing portion to extend radially outward.

According to an embodiment of the present invention, the slinger may comprise a press-fitting portion press-fitted to an outer circumferential surface of the wheel hub; and a radially extended portion extending radially outward from the press-fitting portion, wherein the radially extended portion of the slinger may be disposed spaced apart from the wheel hub to which the slinger is press-fitted.

Further, a vehicle wheel bearing according to the present invention may further comprise other additional configurations without departing from the technical sprit of the present invention.

Advantageous Effects

In a vehicle wheel bearing according to an embodiment of the present invention, a sealing member of a wheel bearing is formed to comprise a first sealing member mounted to a wheel hub (or an inner ring) and a second sealing member mounted to an outer ring, and an elastic sealing portion having a plurality of elastic sealing lips are provided in the first sealing member and the second sealing member so that a complicated labyrinth structure is formed in the sealing member. Thus, it is possible to improve a sealing function of the sealing member.

Furthermore, the vehicle wheel bearing according to an embodiment of the present invention comprises a plurality of non-contact sealing lips (first elastic sealing lips and a second elastic sealing lip in the case of the embodiments described herein) provided in a radial outer portion of an elastic sealing lip (a third elastic sealing lip in the case of the embodiments described herein) which performs a sealing function while being in contact with or not in contact with a slinger. This makes it possible to form more complicated labyrinth structure in the sealing member, and further improve the sealing function of the sealing member.

Furthermore, in the vehicle wheel bearing according to an embodiment of the present invention, the elastic sealing lip (the third elastic sealing lip in the case of the embodiments described herein) which performs the sealing function in cooperation with the slinger is formed to have a structure in which contact sealing lips in contact with the slinger and non-contact sealing lips not in contact with the slinger are combined. This makes it possible to further improve the sealing function of the sealing member.

Furthermore, in the vehicle wheel bearing according to an embodiment of the present invention, radially recessed grooves are formed on a radial outer surface of some or all of the plurality of elastic sealing lips provided in the sealing member. Accordingly, when foreign matters such as moisture flow into the sealing member, the flow rate of the foreign matters can be reduced by the recessed-formed grooves. This makes it possible to delay the inflow rate of the foreign matters into the sealing member and minimize an amount of foreign matters to be flowed into the sealing member.

Furthermore, in the vehicle wheel bearing according to an embodiment of the present invention, radial inner surfaces of the plurality of elastic sealing lips provided in the sealing member are formed as a smooth surface without a convex-concave structure. This makes it possible to easily discharge foreign matters such as moisture introduced into the sealing member to the outside, thus further reducing a risk of exposure of rolling elements and the like provided inside the wheel bearing to the foreign matters.

EXPLANATION OF REFERENCE NUMERALS

100: vehicle wheel bearing
110: wheel hub
120: inner ring
130: outer ring
140: rolling elements
200: sealing member
300: first sealing member
310: slinger
320: first elastic sealing portion
330: first elastic sealing lip
400: second sealing member
410: frame
420: second elastic sealing portion
430: second elastic sealing lip
440: third elastic sealing lip
450: fourth elastic sealing lip
460: dam portion
470: groove
472: lateral groove

DETAILED DESCRIPTION

Hereinafter, preferred embodiments of the present invention will be described in detail with reference to the appended drawings to such an extent that the present invention can be readily practiced by one of ordinary skill in the art.

Detailed descriptions of parts irrelevant to the present invention will be omitted for the purpose of more clearly describing the present invention. Throughout the specification, the same components will be described using same reference numerals. In addition, the shapes and sizes of respective components shown in the drawings are arbitrarily illustrated for the sake of convenience in description, and hence the present invention is not necessarily limited thereto. That is, it should be understood that specific shapes, configurations and characteristics described in the specification may be modified in various embodiments without departing from the spirit and scope of the present invention, and positions or arrangements of individual components may be modified without departing from the spirit and scope of the present invention. Therefore, detailed descriptions to be described below should be construed as non-limitative senses, and the scope of the present invention should be understood to include appended claims and their equivalents.

Vehicle wheel bearing comprising a sealing member according to an embodiment of the present invention.

Referring to FIGS. 3 to 7, there are exemplarily illustrated a vehicle wheel bearing 100 according to an embodiment of the present invention. As illustrated in the drawings, the vehicle wheel bearing 100 according to an embodiment of the present invention comprises a wheel hub 110, an inner ring 120, an outer ring 130 and rolling elements 140, similar to a conventional wheel bearing in overall configurations.

According to an embodiment of the present invention, the wheel hub 110 may be formed in a substantially cylindrical shape extending along an axial direction. A hub flange may be provided near a wheel-side end portion of the wheel hub 110. The hub flange is formed in a shape extending radially outward along a circumferential direction of the wheel hub 110, and may be used to mount a wheel to the wheel hub 110 with hub bolts or the like. Further, a stepped portion may be formed in a vehicle-body-side end portion of the wheel hub 110 to mount the inner ring 120. A raceway surface (an inner raceway surface) may be formed on a portion of an outer circumferential surface of the wheel hub 110 to support the rolling elements 140 from the inner side. In the case of the embodiment illustrated in the drawings, one raceway surface for supporting the rolling elements is directly formed on a portion of the outer circumferential surface of the wheel hub. However, in some embodiments, two inner rings may be mounted to the wheel hub so that all of the raceway surfaces (inner raceway surfaces) of the rolling elements may be formed through the two inner rings.

Figure 3:
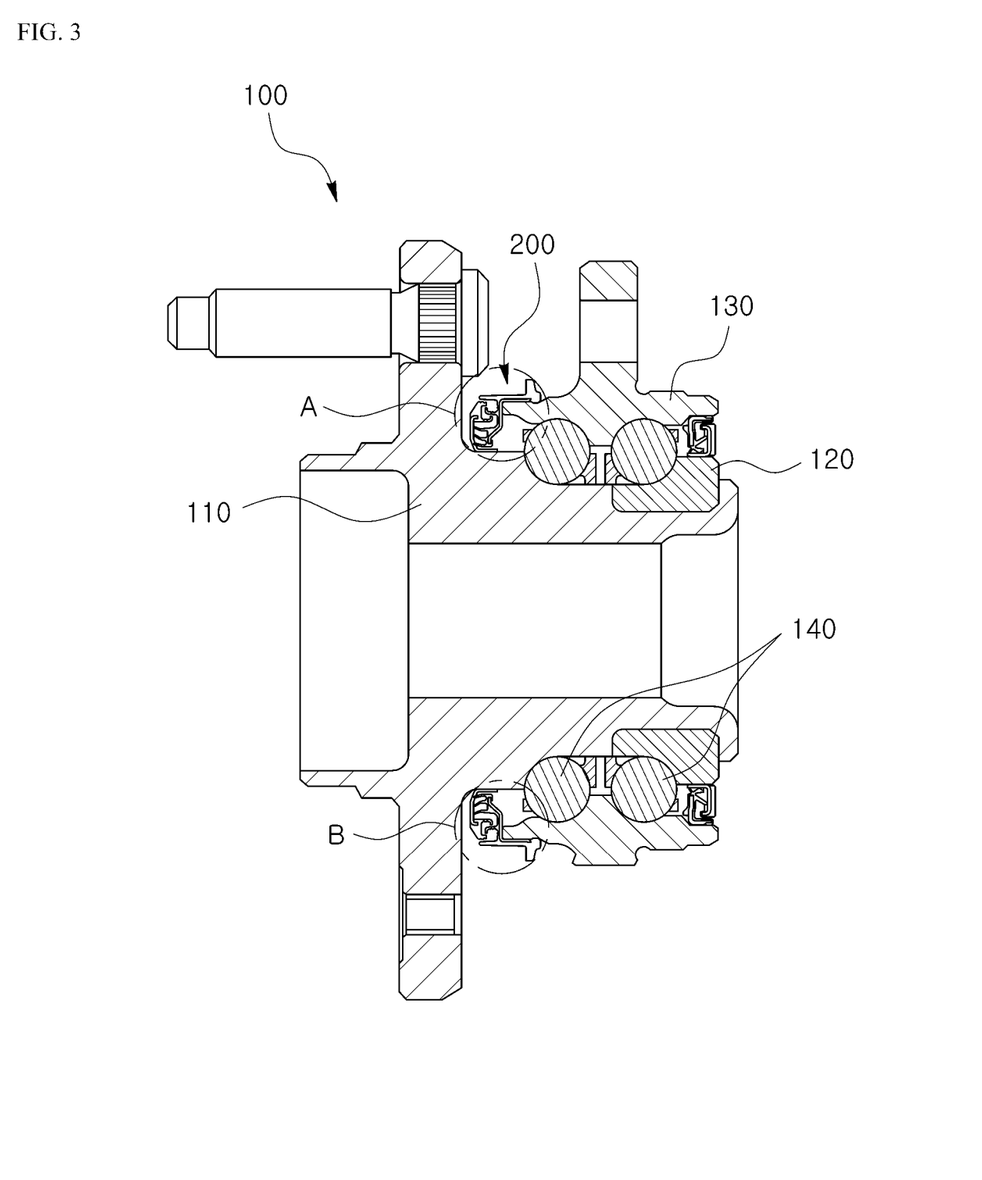
FIG. 3 illustrates an exemplary structure of a vehicle wheel bearing according to an embodiment of the present invention.

The inner ring 120 may be configured to be mounted to one side of the wheel hub 110 in a press-fitting manner. For example, the inner ring 120 may be configured to be stably held on the wheel hub 110 by plastically deforming an end portion of the wheel hub 110 as illustrated in FIG. 3 or fastening nuts or the like to the vehicle-body-side end portion of the wheel hub in a state in which the inner ring 120 is press-fitted to the stepped portion formed in the vehicle-body-side end portion of the wheel hub 110. In addition, the inner ring 120 may be configured to support the rolling elements 140 from the inner side through a raceway surface (inner raceway surface) provided on an outer circumferential surface of the inner ring 120 and in contact with the rolling elements 140.

The outer ring 130 has a mounting flange formed on an outer circumferential surface thereof to mount the vehicle wheel bearing 100 to the vehicle body. The outer ring 130 may is configured to have raceway surfaces (outer raceway surfaces) formed on an inner circumferential surface thereof and in contact with the rolling elements 140. The raceway surfaces (outer raceway surfaces) formed on the inner circumferential surface of the outer ring 130 may be configured to accommodate and support the rolling elements 140 as rolling members between the outer raceway surfaces and the inner raceway surfaces in cooperation with the raceway surfaces (inner raceway surfaces) formed on the wheel hub 110 and/or the inner ring 120.

The rolling elements 140 are disposed radially inward of the outer ring 130, specifically, between the raceway surfaces (outer raceway surfaces) formed on the outer ring 130 and the raceway surfaces (inner raceway surfaces) formed on the wheel hub 110 and/or the inner ring 120, and may perform a function of rotatably supporting the wheel hub 110 to which the wheel is mounted relative to the outer ring 130 fixed to the vehicle body.

Figure 4:
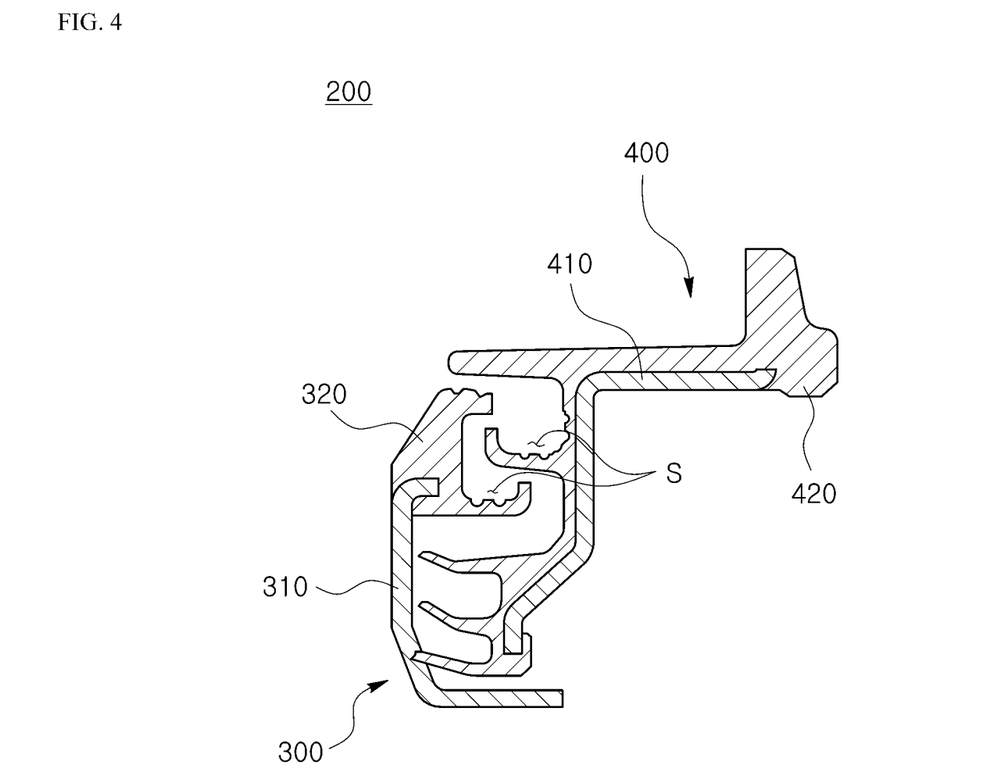
FIG. 4 illustrates an exemplary structure of a sealing member that can be applied to the vehicle wheel bearing according to an embodiment of the present invention.
Figure 5:
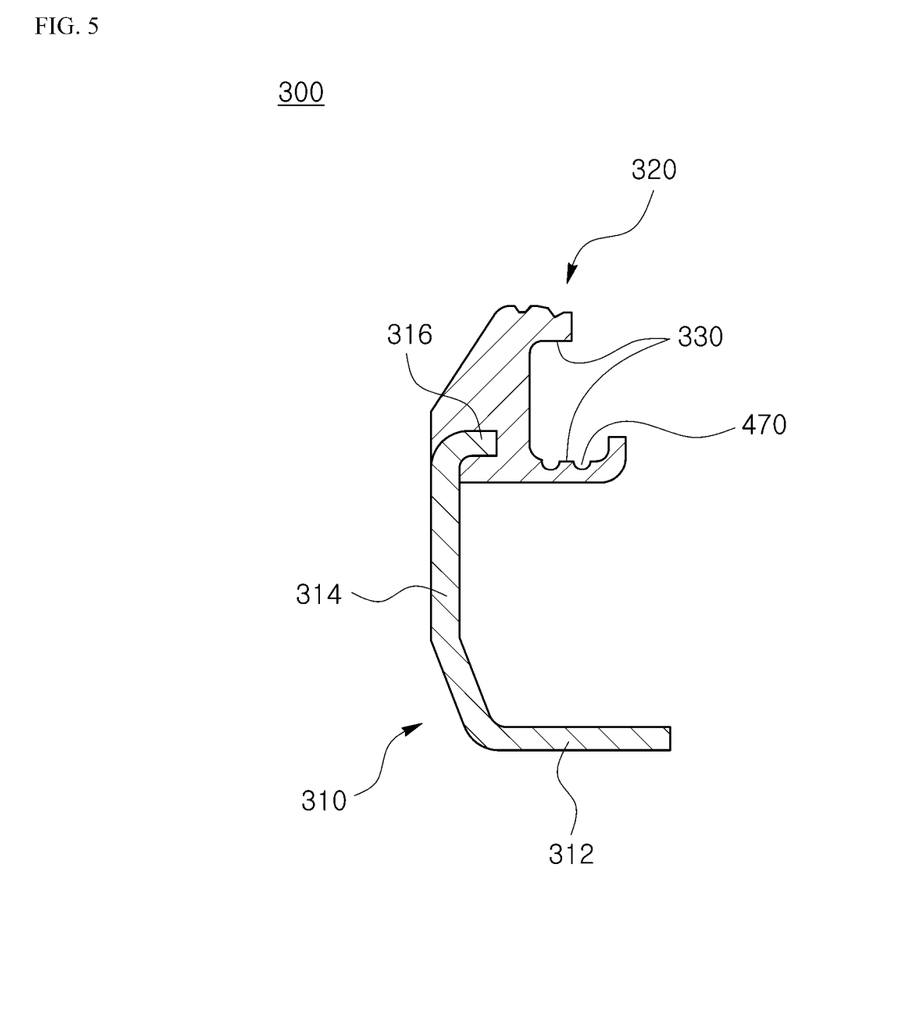
FIG. 5 illustrates an exemplary structure of a first sealing member mounted to a wheel hub or an inner ring in the sealing member illustrated in FIG. 4.
Figure 6:
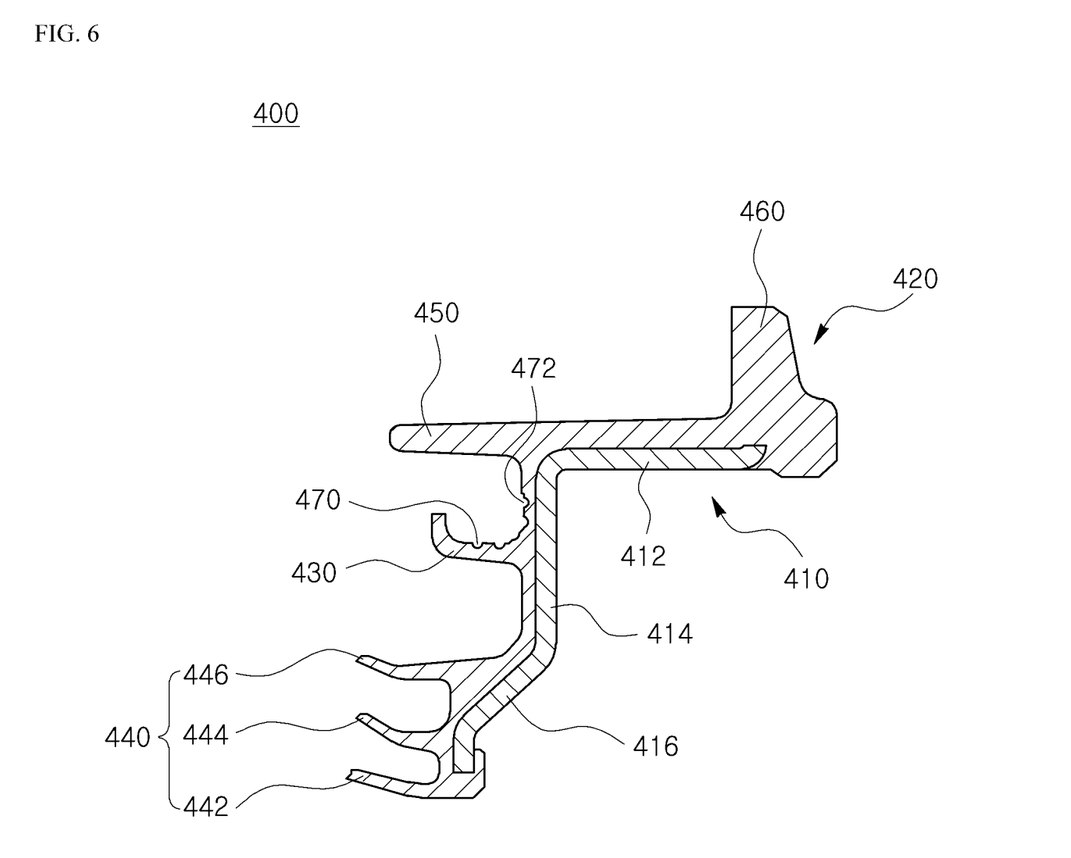
FIG. 6 illustrates an exemplary structure of a second sealing member mounted to the outer ring in the sealing member illustrated in FIG. 4.

In the meantime, according to an embodiment of the present invention, a sealing member 200 may be provided on one side or both sides of the vehicle wheel bearing to prevent external foreign matters from flowing into the vehicle wheel bearing or prevent internal lubricant from leaking to the outside. Referring to FIG. 4, the sealing member (for example, a wheel-side sealing member) that can be applied to the vehicle wheel bearing 100 according to an embodiment of the present invention is illustrated.

As illustrated in the drawings, the sealing member 200 of the vehicle wheel bearing 100 according to an embodiment of the present invention may comprise a first sealing member 300 mounted to the wheel hub 110 or the inner ring 120; and a second sealing member 400 mounted to the outer ring 130.

According to an embodiment of the present invention, the first sealing member 300 may be configured to comprise a slinger 310 press-fitted to the wheel hub 110 or the inner ring 120; and an elastic sealing portion (first elastic sealing portion 320) attached to the slinger 310 to perform a sealing function.

According to an embodiment of the present invention, the slinger 310 may be configured to be mounted to the outer circumferential surface of the wheel hub 110 in a press-fitting manner. Specifically, the slinger 310 may be configured to comprise a press-fitting portion 312 mounted to the outer circumferential surface of the wheel hub 110 in a press-fitting manner; and a radially extended portion 314 extending radially outward from the press-fitting portion 312.

The press-fitting portion 312 of the slinger 310 may be configured to extend substantially along the axial direction of the vehicle wheel bearing, and may be configured to have an inner diameter that corresponds to an outer diameter of a slinger mounting surface formed in the wheel hub 110 so that the slinger 310 is press-fitted to the wheel hub 110.

The radially extended portion 314 of the slinger 310 may extend radially outward from one end portion of the press-fitting portion 312 and may be configured to be mounted to the wheel hub 110 while being spaced apart from the wheel hub 110. In the sealing member 200 according to an embodiment of the present invention, unlike the conventional sealing member illustrated in FIG. 2, since the radially extended portion 314 is mounted to the wheel hub 110 while being spaced apart from the wheel hub 110, even when the wheel hub 110 is deformed due to a load applied thereto, the slinger 210 may not be affected by such a deformation. This makes it possible to stably maintain the sealing function of the sealing member 200.

Further, according to an embodiment of the present invention, the slinger 310 may further comprise an axially extended portion 316 extending in the axial direction from the radially extended portion 314. Accordingly, the elastic sealing portion (the first elastic sealing portion 320; to be described later) of the first sealing member 300 can be more easily attached to a radial outer portion of the slinger 310.

In the case of the embodiment illustrated in the drawings, the radially extended portion 314 extends radially outward in a direction substantially perpendicular to the axial direction, and the axially extended portion 316 extends in a direction substantially parallel to the axial direction. However, the radially extended portion 314 and the axially extended portion 316 may not necessarily extend in the directions perpendicular and parallel to the axial direction, respectively, and may extend in a direction inclined at a predetermined angle with respect to the axial direction.

According to an embodiment of the present invention, the first elastic sealing portion 320 provided in the slinger 310 may have elastic sealing lip (first elastic sealing lip 330) extending toward the second sealing member 400 (to be described later) to perform the sealing function in cooperation with the second sealing member 400. For example, in the case of the embodiment illustrated in the drawings, two first elastic sealing lips 330 are provided in the first elastic sealing portion 320 to perform the sealing function. In the case in which the first elastic sealing lip is provided with the plurality of elastic sealing lips, the sealing lip located radially outward (the sealing lip located at the uppermost portion in FIG. 5) may be formed to have a thicker thickness than the other sealing lips. The reason for this is that the sealing lip located at the uppermost portion is positioned close to a passage into which foreign matters are introduced, and thus, is likely to wear due to friction with the foreign matters.

According to an embodiment of the present invention, the second sealing member 400 may comprise a frame 410 mounted to the outer ring 130 in a press-fitting manner; and an elastic sealing portion (second elastic sealing portion 420) attached to the frame 410 to perform a sealing function.

According to an embodiment of the present invention, the frame 410 may form a skeleton of the second sealing member 400, and may be formed by bending a metal plate or the like. For example, the frame 410 may comprise a press-fitting portion mounted to the outer ring 130 in a press-fitting manner; and an extended portion extending radially inward from the press-fitting portion. In the case of the embodiment illustrated in the drawings, the frame 410 is provided with a press-fitting portion having a substantially L-shaped cross-sectional structure so as to surround one end of the outer ring 130 [L-shaped press-fitting portion having an outer diameter press-fitting portion 412 mounted to a radial outer side of the outer ring 130 in a press-fitting manner and an end portion mounting portion 414 in contact with an axial end portion of the outer ring 130]; and an extended portion 416 extending radially inward from the press-fitting portion . . . . However, the frame 410 is not limited to the shape illustrated in the drawings, but may be formed in various shapes that it can be mounted to an outer circumferential surface or an inner circumferential surface of the outer ring 130.

According to an embodiment of the present invention, the elastic sealing portion (the second elastic sealing portion 420) provided in the second sealing member 400 may comprise an elastic sealing lip configured to perform a sealing function in cooperation with the first sealing member 300. For example, the elastic sealing lip may comprise a second elastic sealing lip 430 which performs the sealing function in cooperation with the first elastic sealing lips 330 of the first sealing member 300; and a third elastic sealing lip 440 which performs the sealing function in cooperation with the slinger 310 of the first sealing member 300.

Specifically, the second elastic sealing lip 430 may be configured to extend from the frame 410 toward the first sealing member 300 to form a labyrinth structure in cooperation with the first elastic sealing lips 330 provided in the first sealing member 300. Through such a labyrinth structure, the second elastic sealing lip 430 can perform the sealing function.

According to an embodiment of the present invention, the first elastic sealing lips 330 provided in the first sealing member 300 and the second elastic sealing lip 430 provided in the second sealing member 400 may be configured such that one end portion of the elastic sealing lips does not contact with the other elastic sealing member. Thus, the first elastic sealing lips 330 and the second elastic sealing lip 430 may perform the sealing function while being not in contact with each other. Some or all of the first elastic sealing lips 330 and the second elastic sealing lip 430 may be configured such that the end portion thereof extends radially outward to form an accommodation space S in which external foreign matters may be accommodated.

According to an embodiment of the present invention, some or all of the first elastic sealing lips 330 provided in the first sealing member 300 and the second elastic sealing lip 430 provided in the second sealing member 400 may be configured to be arranged in an alternating manner. For example, in the case of the embodiment illustrated in the drawings, the second elastic sealing lip 430 provided in the second sealing member 400 is disposed between the two first elastic sealing lips 330 provided in the first sealing member 300 to form a structure in which the first elastic sealing lips 330 and the second elastic sealing lip 430 are alternately arranged. With this structure, by the elastic sealing lips provided in the first sealing member 300 and the second sealing member 400, it is possible to form a labyrinth structure with more complicated shape in the sealing members, thus preventing the inflow of foreign matters in an effective manner.

According to an embodiment of the present invention, the third elastic sealing lip 440 provided in the second sealing member 400 may be configured to perform a sealing function in cooperation with the slinger 310 of the first sealing member 300. For example, the third elastic sealing lip 440 provided in the second sealing member 400 may be formed to extend from the frame 410 toward the slinger 310 to perform the sealing function in contact or non-contact with the slinger 310.

According to an embodiment of the present invention, the third elastic sealing lip 440 may have a contact sealing lip whose end is in contact with the slinger 310 and a non-contact sealing lip disposed adjacent to the slinger 310 without coming contact with the slinger 310. In the case of the embodiment illustrated in the drawings, the third elastic sealing lip 440 may be provided with the contact elastic sealing lip located radially inward and the non-contact elastic sealing lips located radially outward of the contact elastic sealing lip. As described above, in the sealing member 200 of the vehicle wheel bearing 100 according to an embodiment of the present invention, one or more non-contact sealing lips 444 and 446 are further disposed radially outward of a contact elastic sealing lip 442 in contact with the slinger 310. This makes it possible to form more complicated labyrinth structure in the sealing member 200 and further improve the sealing function of the sealing member 200 without significantly increasing the number of contact sealing lips.

Further, according to a preferred embodiment of the present invention, the non-contact elastic sealing lips 444 and 446 provided radially outward of the contact elastic sealing lip 442 may be configured such that end portions thereof are spaced apart at a narrow gap of 0.2 mm or less from the slinger 310 to form the complicated labyrinth structure.

According to an embodiment of the present invention, the second sealing member 400 may further comprise a fourth elastic sealing lip 450 disposed more radially outward than the first elastic sealing portion 320 of the first sealing member 300. Specifically, as illustrated in FIGS. 3 and 4, the fourth elastic sealing lip 450 may be configured to extend in the axial direction toward the first sealing member 300 (in the case of the embodiment illustrated in the drawings, toward the wheel-side) so as to entirely or partially surround a radial outer side of the first elastic sealing portion 320. With this configuration, it is possible to block foreign matters from flowing inward of the sealing member by the fourth elastic sealing lip 450, thereby further improving the sealing function of the sealing member 200.

According to an embodiment of the present invention, a dam portion 460 may be further formed on a radial outer surface of the second sealing member 400 to extend radially outward. As illustrated in the drawings, since the dam portion 460 has a structure that extends radially outward, it is possible to more effectively prevent foreign matters from flowing inward of the sealing member from the vehicle-body-side.

Further, according to an embodiment of the present invention, some or all of the elastic sealing lips (the first to fourth elastic sealing lips) provided in the first sealing member 200 and the second sealing member 400 may be configured to have grooves 470 formed on a radial outer surface thereof. According to an embodiment of the present invention, the grooves 470 may be formed in sealing lips which perform the sealing function in a noncontact manner. For example, in the case of the sealing member 200 illustrated in the drawings, the grooves 470 are formed on the radial outer surface of the first elastic sealing lip 330 of the first sealing member 300 and the second elastic sealing lip 430 of the second sealing member 400 to be recessed from the radial outer surfaces.

As described above, when the grooves 470 are formed on the radial outer surface of the elastic sealing lips constituting the sealing member 200, in the course of that foreign matters such as moisture flow into the sealing member 200, the flow rate of the foreign matters may be reduced by the recessed grooves. This makes it possible to delay the inflow rate of the foreign matters into the sealing member and minimize an amount of foreign matters to be flowed into the sealing member (see FIG. 7A).

According to an embodiment of the present invention, the grooves 470 formed on the radial outer surfaces of the elastic sealing lips may be formed in various shapes such as a rounded shape, a polygonal shape such as triangle or the like, and the like, as illustrated in the drawings. Preferably, the grooves 470 may be formed at a depth of 0.05 mm or more so as to sufficiently lower the inflow rate of the foreign matters.

In some embodiments, lateral grooves 472 may be further formed on a lateral sealing portion of at least one of the first sealing member 300 and the second sealing member 400 to more effectively lower the flow rate of the foreign matters into the sealing member.

Further, according to an embodiment of the present invention, radial inner surfaces of the elastic sealing lips provided in the first sealing member 300 and the second sealing member 400 may be formed as a smooth surface with no convex-concave structure such as a groove. As described above, by forming the radial inner surfaces of the elastic sealing lips as a smooth surface, foreign matters such as moisture introduced into the sealing member can be efficiently discharged to the outside through the smooth radial inner surfaces of the elastic sealing lips when the elastic sealing lips are located at the lower side during the rotation of the wheel. This further improves the sealing function of the sealing member.

Figure 7A:
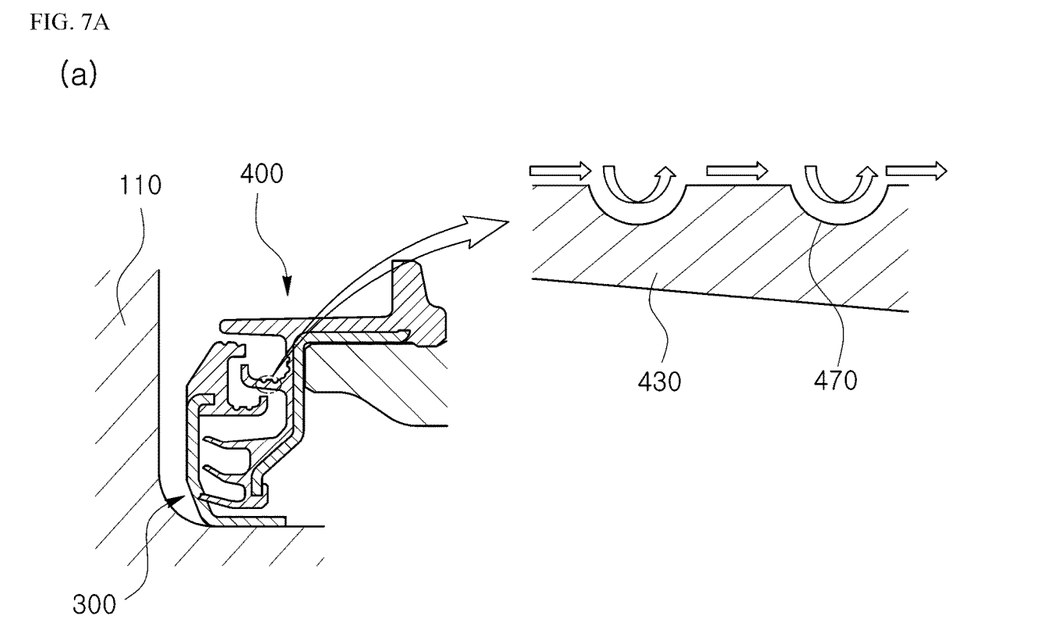
FIGS. 7A and 7B are enlarged views of portions A and B illustrated in FIG. 3, which exemplarily illustrates the principle of delaying the inflow of foreign matters by the sealing member of the vehicle wheel bearing according to an embodiment of the present invention (FIG. 7A) and the principle of smoothly discharging the foreign matters (FIG. 7B), respectively.
Figure 7B:
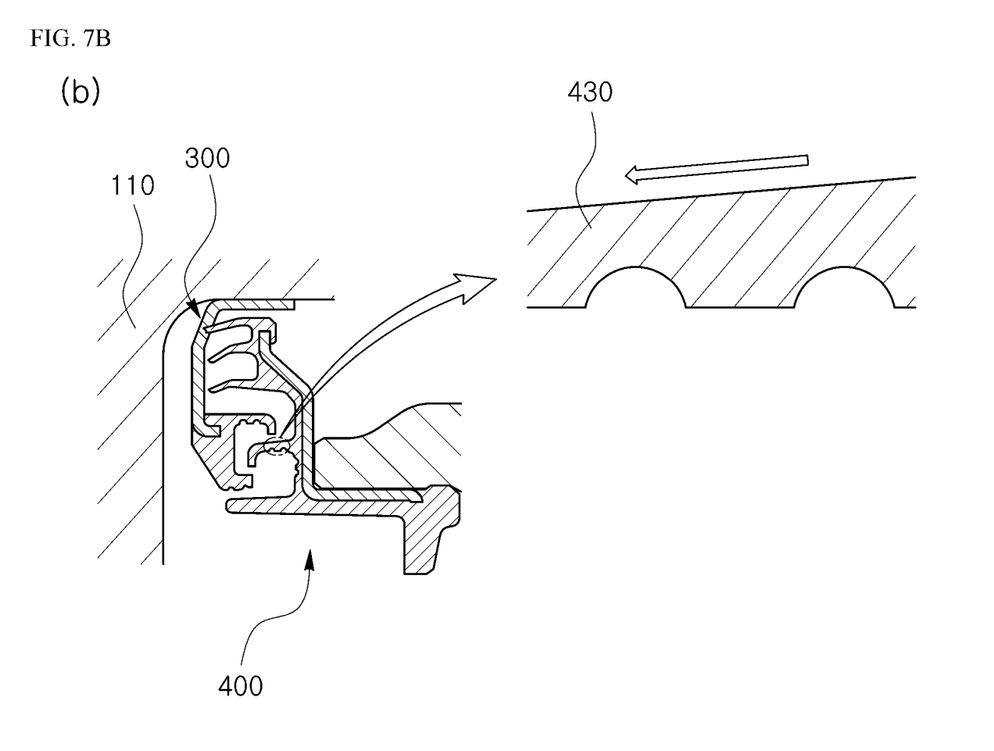

Further, according to an embodiment of the present invention, the radial inner surfaces of some or all of the elastic sealing lips provided in the first sealing member 300 and the second sealing member 400 may be formed to have a structure inclined at a predetermined inclination with respect to the central axis. For example, as illustrated in FIG. 7, the elastic sealing lips provided in the first sealing member 300 and the second sealing member 400 may be formed to have the radial inner surface of an inclined structure in which the diameter of the radial inner surfaces is increased as a distance from the slinger 310 or the frame 410 becomes larger. As described above, by forming the radial inner surfaces of the elastic sealing lips provided in the first sealing member 300 and the second sealing member 400 as a inclined surface, it is possible to further prevent foreign matters from flowing inward of the wheel bearing. Furthermore, it is possible to easily discharge the foreign matters introduced inward of the wheel bearing to the outside of the wheel bearing as the wheel bearing rotates. This makes it possible to more effectively prevent the foreign matters from flowing inward of the wheel bearing, for example, into a space where the rolling elements are located).

While the present invention has been described above by way of particular matters, such as specific components and the like, and exemplary embodiments, these embodiments are provided to further facilitate overall understanding of the present invention, and the present invention is not limited thereto. Various modifications and variations may be made from the above descriptions by those skilled in the art.

For example, in the case of the embodiments illustrated in the drawings, both the first sealing member 300 mounted to the wheel hub (or the inner ring) and the second sealing member 400 mounted to the outer ring are provided with the elastic sealing lips, and the grooves 470 are formed in some or all of the elastic sealing lips of both the first sealing member 300 and the second sealing member 400. However, the structure of the grooves 470 may be equally applied to the structure in which the elastic sealing lips are formed only on the second sealing member 400 mounted to the outer ring, like the conventional sealing device illustrated in FIG. 2. In addition, the structure of the wheel bearing may be changed to various other structures unlike the embodiments illustrated in the drawings, as long as it can be applied to the vehicle wheel bearing.

Accordingly, the spirit of the present invention should not be limited to the above-described embodiments, and not only the append claims but also all those modified equally or equivalently to the claims are intended to fall within the scope of the spirit of the present invention.

What is claimed is:

1. A vehicle wheel bearing for rotatably mounting and supporting a wheel of a vehicle to a vehicle body, comprising:
    a wheel hub having a hub flange to which the wheel is mounted;
    at least one inner ring mounted to one side of the wheel hub in a press-fitting manner;
    an outer ring provided radially outward of the inner ring and having a mounting flange to be mounted to the vehicle body on an outer circumferential surface;
    one or more rolling elements provided radially inward of the outer ring; and
    a sealing member configured to prevent foreign matters from flowing into the vehicle wheel bearing,
    wherein the sealing member comprises a first sealing member mounted to the wheel hub or the inner ring; and a second sealing member mounted to the outer ring,
    wherein one or more elastic sealing lips are provided in one or both of the first sealing member and the second sealing member, and
    wherein at least two radially recessed grooves are formed on a radial outer surface of some or all of the one or more elastic sealing lips such that a concave-convex structure is formed on the radial outer surface.

2. The vehicle wheel bearing of claim 1, wherein the grooves are formed to be recessed to a depth of 0.05 mm or more from the radial outer surface.

3. The vehicle wheel bearing of claim 2, wherein the one or more elastic sealing lips comprise one or more contact sealing lips and one or more non-contact sealing lips, and the grooves are formed in some or all of the non-contact sealing lips.

4. The vehicle wheel bearing of claim 3, wherein the one or more elastic sealing lips have a smooth radial inner surface without a concave-convex structure.

5. The vehicle wheel bearing of claim 4, wherein one or more lateral grooves are formed on a lateral sealing portion that extends in a radial direction.

6. The vehicle wheel bearing of claim 4, wherein the first sealing member comprises a slinger mounted to the wheel hub in a press-fitting manner,
    the slinger comprises a press-fitting portion press-fitted to an outer circumferential surface of the wheel hub; and a radially extended portion extending radially outward from the press-fitting portion, and the radially extended portion of the slinger is disposed spaced apart from the wheel hub to which the slinger is press-fitted.

7. A vehicle wheel bearing for rotatably mounting and supporting a wheel of a vehicle to a vehicle body, comprising:
a wheel hub having a hub flange to which the wheel is mounted;
at least one inner ring mounted to one side of the wheel hub in a press-fitting manner;
an outer ring provided radially outward of the inner ring and having a mounting flange to be mounted to the vehicle body on an outer circumferential surface;
one or more rolling elements provided radially inward of the outer ring; and
a sealing member configured to prevent foreign matters from flowing into the vehicle wheel bearing,
wherein the sealing member comprises a first sealing member mounted to the wheel hub or the inner ring; and a second sealing member mounted to the outer ring,
the first sealing member comprises a slinger mounted to the wheel hub in a press-fitting manner and a first elastic sealing portion attached to the slinger,
the second sealing member comprises a frame mounted to the outer ring in a press-fitting manner and a second elastic sealing portion attached to the frame,
the first elastic sealing portion comprises at least one first elastic sealing lip extending toward the second sealing member,
the second elastic sealing portion comprises a second elastic sealing lip extending toward the first sealing member and configured to perform a sealing function in cooperation with the at least one first elastic sealing lip; and an at least one third elastic sealing lip extending toward the first sealing member and configured to perform the sealing function in cooperation with the slinger, and
the at least one first elastic sealing lip and the second elastic sealing lip are disposed more radially outward than the at least one third elastic sealing lip while being not in contact with each other,
wherein end portions of the at least one first elastic sealing lip and the second elastic sealing lip extend radially outward to form an accommodation space S in which the foreign matters introduced from an outside is accommodated,
wherein the at least one first elastic sealing lip and the second elastic sealing lip are alternately disposed in a radial direction, and
wherein the at least one third elastic sealing lip comprises at least one contact sealing lip whose end is in contact with the slinger and at least one non-contact sealing lip whose end is disposed adjacent to the slinger.

8. The vehicle wheel bearing of claim 7, wherein the at least one non-contact sealing lip of the at least one third elastic sealing lip is located more radially outward than the at least one contact sealing lip of the third elastic sealing lip.

9. The vehicle wheel bearing of claim 8, wherein the end of the at least one non-contact sealing lip of the at least one third elastic sealing lip is located within a distance of 0.2 mm or less from the slinger.

10. The vehicle wheel bearing of claim 9, wherein one or more radially recessed grooves are formed on a radial outer surface of some or all of the at least one first elastic sealing lip and the second elastic sealing lip.

11. The vehicle wheel bearing of claim 10, wherein the grooves are formed to be recessed to a depth of 0.05 mm or more from the radial outer surface.

12. The vehicle wheel bearing of claim 11, wherein the at least one first elastic sealing lip and the second elastic sealing lip have a smooth radial inner surface without a concave-convex structure.

13. The vehicle wheel bearing of claim 12, wherein one or more lateral grooves are further formed on a lateral sealing portion that extends in the radial direction in at least one of the first elastic sealing portion and the second elastic sealing portion.

14. The vehicle wheel bearing of claim 12, wherein the second elastic sealing portion further comprises a fourth elastic sealing lip provided radially outward of the second elastic sealing lip and configured to surround a radial outer portion of the first elastic sealing portion.

15. The vehicle wheel bearing of claim 14, wherein the second elastic sealing portion further comprises a dam portion provided on a radial outer surface of the second elastic sealing portion to extend radially outward.

16. The vehicle wheel bearing of claim 15, wherein the slinger comprises a press-fitting portion press-fitted to an outer circumferential surface of the wheel hub; and a radially extended portion extending radially outward from the press-fitting portion, and
the radially extended portion of the slinger is disposed spaced apart from the wheel hub to which the slinger is press-fitted.

* * * * *